US008811806B2

(12) United States Patent
Radan

(10) Patent No.: US 8,811,806 B2
(45) Date of Patent: Aug. 19, 2014

(54) POWER SUPPLY ARRANGEMENT FOR DIRECT ELECTRICAL HEATING OF A PIPELINE SYSTEM

(75) Inventor: Damir Radan, Sandnes (NO)

(73) Assignee: Siemens Aktiengesllschaft, Munich (DE)

( * ) Notice: Subject to any disclaimer, the term of this patent is extended or adjusted under 35 U.S.C. 154(b) by 739 days.

(21) Appl. No.: 13/060,493

(22) PCT Filed: Jul. 24, 2009

(86) PCT No.: PCT/EP2009/059572
§ 371 (c)(1),
(2), (4) Date: Mar. 9, 2011

(87) PCT Pub. No.: WO2010/031626
PCT Pub. Date: Mar. 25, 2010

(65) Prior Publication Data
US 2011/0156691 A1    Jun. 30, 2011

(30) Foreign Application Priority Data
Sep. 19, 2008    (EP) .................................... 08016537

(51) Int. Cl.
*A47J 31/00*    (2006.01)
*H05B 3/40*    (2006.01)

(52) U.S. Cl.
USPC ........................... 392/465; 392/469; 392/478

(58) Field of Classification Search
None
See application file for complete search history.

(56) References Cited

U.S. PATENT DOCUMENTS 3,265,958 A    8/1966  Sueien .............................. 323/76
4,680,689 A *  7/1987  Payne et al. ...................... 363/26
4,689,735 A *  8/1987  Young ............................. 363/155
4,739,466 A *  4/1988  Glennon et al. ................. 363/89
5,311,419 A *  5/1994  Shires .............................. 363/65
6,310,334 B1* 10/2001  Niwa et al. ..................... 219/644
6,707,012 B2*  3/2004  Stone, Jr. ......................... 219/482
2008/0236810 A1* 10/2008  Bornes et al. ..................... 166/61

FOREIGN PATENT DOCUMENTS

| DE | 568690 | 1/1933 | |
| DE | 1060068 | 6/1959 | ............ H05B 18/15 |
| DE | 1438401 | 10/1968 | |
| GB | 2170623 A | 8/1986 | ............... H02J 3/26 |
| JP | 63093456 A | 4/1988 | ............... B22D 11/10 |
| JP | 6310348 A | 11/1994 | ............... H01F 29/02 |
| RU | 2079958 C1 | 5/1997 | ............... H02M 7/02 |
| RU | 39738 U1 | 5/2004 | ............... H01F 27/30 |
| RU | 2253931 C1 | 6/2005 | ............... H02J 3/26 |
| SU | 1032486 A1 | 7/1983 | ............... H01F 27/14 |
| WO | 2007/011231 A2 | 1/2007 | ............... A61P 19/08 |
| WO | 2010/031626 A1 | 3/2010 | ............... H02J 3/26 |

* cited by examiner

*Primary Examiner* — Thor Campbell
(74) *Attorney, Agent, or Firm* — King & Spalding L.L.P.

(57) ABSTRACT

In a power supply arrangement for supplying electrical power to the pipeline, the power supply arrangement for direct electrical heating of a pipeline system has basically a three phase transformer, a symmetrization unit, and a compensation unit. The three phase transformer is adapted to support a single phase load connected between a first and a second phase of the transformer. The transformer has at least one first tap changer at a high voltage side of the transformer. The symmetrization unit has a first capacitor connected between the first phase and a third phase of the transformer and an inductor connected between the second phase and the third phase of the transformer. The compensation unit has a second capacitor connected between the first phase and the second phase of the transformer. The first tap changer, the first capacitor, the second capacitor and the inductor are adapted to be varied on-load.

15 Claims, 4 Drawing Sheets

POWER SUPPLY ARRANGEMENT FOR DIRECT ELECTRICAL HEATING OF A PIPELINE SYSTEM

CROSS-REFERENCE TO RELATED APPLICATIONS

This application is a U.S. National Stage Application of International Application No. PCT/EP2009/059572 filed Jul. 24, 2009, which designates the United States of America, and claims priority to EP Application No. 08016537.6 filed Sep. 19, 2008. The contents of which are hereby incorporated by reference in their entirety.

TECHNICAL FIELD

This invention relates to electrical heating of pipeline systems. More particularly the invention relates to a power system for supplying electrical power to the pipeline.

BACKGROUND

Formation of hydrates is a well known problem in subsea production systems for oil and gas. Several options are available to solve this problem. Traditionally, chemicals have been used. Recently a more effective direct electric heating (DEH) method is used for heating of the pipeline by forcing a high electric current through the pipeline itself. In any form of electrical heating of pipelines a source of electrical power supplying at least a few hundred kilowatts is normally needed. The power often needs to be applied in a programmed sequence to achieve selected operating conditions. Conversion of power from three-phase to single-phase is often necessary, especially in subsea pipeline applications, where power is taken from an existing three-phase power grid. What is needed is an efficient, versatile power supply system that can supply these needs.

SUMMARY

According to various embodiments, an improved power supply arrangement for direct electrical heating applications can be provided.

According to an embodiment, a power supply arrangement for direct electrical heating of a pipeline system may comprise a three phase transformer adapted to support a single phase load connected between a first phase and a second phase of the transformer, said transformer comprising at least one first tap changer at a high voltage side of the transformer; a symmetrization unit comprising a first capacitor means connected between the first phase and a third phase of the transformer and an inductor means connected between the second phase and the third phase of said transformer; and a compensation unit comprising a second capacitor means connected between the first phase and the second phase of the transformer, wherein the first tap changer, the first capacitor means, the second capacitor means and/or the inductor means are adapted to be varied on-load.

According to a further embodiment, the power supply arrangement may further comprise a control unit adapted to automatically control voltage levels of said first tap changer, capacitance of said first capacitor means and said second capacitor means and inductance of said inductor means. According to a further embodiment, the three phase transformer may further comprise at least one second tap changer. According to a further embodiment, the inductance of the inductor means can be adapted to be changed on-load using a third tap changer. According to a further embodiment, automatically controlling the capacitance of said first capacitor means further may comprise the step of switching at least one first additional capacitor by means of a corresponding vacuum contactor. According to a further embodiment, automatically controlling the capacitance of said second capacitor means further may comprise the step of switching at least one second additional capacitor by means of a corresponding vacuum contactor. According to a further embodiment, the transformer, the first capacitor means, the second capacitor means, the inductor means, the first additional capacitor, the second additional capacitor and/or the vacuum contactor can be dry-type.

BRIEF DESCRIPTION OF THE DRAWINGS

The present invention is further described hereinafter with reference to illustrated embodiments shown in the accompanying drawings, in which.

DETAILED DESCRIPTION

Figure 1:
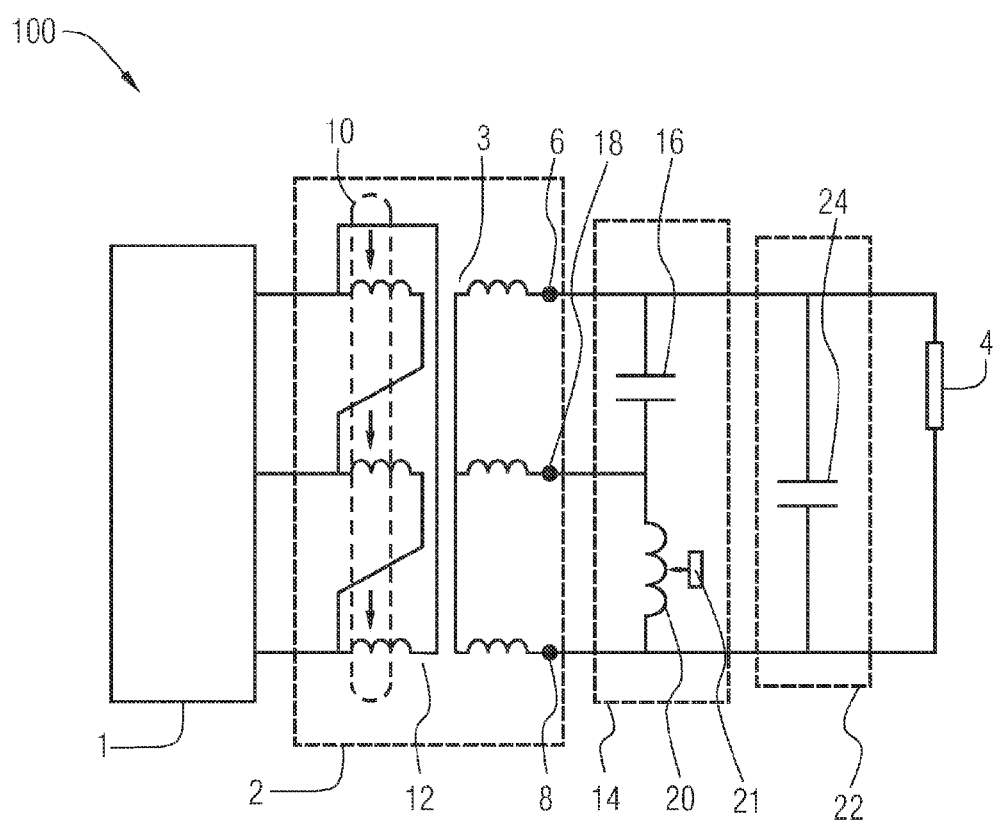
FIG. 1 shows a circuit diagram of a power supply arrangement for a pipeline system.

Accoridng to various embodiments, a power supply arrangement for direct electrical heating of a pipeline system may comprise:
   a three phase transformer adapted to support a single phase load connected between a first and a second phase of the transformer, said transformer comprising at least one first tap changer at a high voltage side of the transformer;
   a symmetrization unit comprising a first capacitor means connected between the first phase and a third phase of the transformer and an inductor means connected between the second phase and the third phase of said transformer; and
   a compensation unit comprising a second capacitor means connected between the first phase and the second phase of the transformer,
wherein the first tap changer, the first capacitor means, the second capacitor means and the inductor means are adapted to be varied on-load.

Single phase cables are used for pipeline heating. The cables are connected to the three-phase power supply. The single-phase load is transferred to three-phase load for a three-phase transformer by means of symmetrization unit comprising a first capacitor means and an inductor means. In addition, a compensation unit, comprising a second capacitor means, is used to compensate for the low power factor of the load. If the load is not compensated and not symmetrized, the load unbalance would be very high and results in high negative sequence current. This would make problems for safe operation of the transformer and generators. Heating load for DEH can be selected in the range from minimum to maximum load by changing the applied voltage on the three-phase transformer. By changing the voltage level the heating power level can be changed. This is accomplished by use of on-load tap changer connected at the high voltage side of the transformer while the transformer and the whole DEH system are fully energized. The solution enables the changing of the capacitive and inductive values of the corresponding capacitive and inductive means on-load, while the system is energized. This allows real-time on-load optimization where the power factor to the transformer will be very close to one and negative sequence current will be very close to zero.

In an embodiment, the modules within said framework further comprise a control unit adapted to automatically control voltage levels of said first tap changer, capacitance of said first capacitor means and said second capacitor means and inductance of said inductor means. This, enables the automatic controlling of the transformer, capacitor means and the inductor means when the pipeline system is fully energized. It can also serve to automatically control the system which can be temporarily de-energized. The control unit could be a Programmable Logic Controller (PLC) controlled from on-site or a remote location.

In an alternative embodiment, the three phase transformer further comprises at least one second tap changer. The second tap changer can act as an off-load tap changer and by using taps, the operation profile will be extended beyond usual offered range enabling to change to different voltage positions.

In another alternative embodiment, the inductance of the inductor means is adapted to be changed on-load using a third tap changer. The inductance of the inductor means need to be changed to balance the load i.e. to transform a single-phase to three-phase balanced load. The tap changer helps in changing the inductance when the pipeline system is fully energized.

In another alternative embodiment, automatically controlling the capacitance of said first capacitor means further comprises the step of switching at least one first additional capacitor by means of a corresponding vacuum contactor. Also, automatically controlling the capacitance of said second capacitor means further comprises the step of switching at least one second additional capacitor by means of a corresponding vacuum contactor. This enables on-load changing of the capacitance value as per the measured load parameters and power requirement for the DEH system.

In another alternative embodiment, the transformer, the first capacitor means, the second capacitor means, the inductor means, the first additional capacitor, the second additional capacitor and the vacuum contactor are dry-type. Using said components lowers potential risks with regards to fire thereby enabling more safety.

According to various embodiment, a solution can be provided which allows fully automated operation. The solution involves full automatic adjustment of capacitive and inductive means on-load. The transformer voltage is changed using combination of on-load tap changer and off-load taps. This allows permanent on-load operation and requires seldom stoppage of the DEH system.

FIG. 1 shows a circuit diagram of a power supply arrangement 100 for a pipeline system. The power may be taken from an existing three-phase power grid 1. The power supply arrangement comprises a three phase transformer 2 adapted to support a single phase load 4 connected between a first phase 6 and a second phase 8 of the transformer 2. The transformer comprises a high voltage side 12 and a low voltage side 3, wherein a first tap changer 10 is connected to the high voltage side 12 of the transformer 2. The arrangement involves a symmetrization unit 14 comprising a first capacitor means 16 connected between the first phase 6 and a third phase 18 of the transformer and an inductor means 20 connected between the second phase 8 and the third phase 18 of said transformer 2. The single-phase load is transferred to three-phase load for a three-phase transformer using this unit. A compensation unit 22 is also incorporated in the arrangement which comprises a second capacitor means 24 connected between the first phase 6 and the second phase 8 of the transformer 2. The unit compensates for the low power factor of the load. Based on the requirement, the capacitive and the inductive values associated with the symmetrization and compensation units can be varied. The first tap changer 10, the first capacitor means 16, the second capacitor means 24 and the inductor means 20 are adapted to be varied on-load. On load tap changers allows changing voltage while DEH system remains energized (on-load). This allows real-time on-load optimization where the power factor to the transformer is very close to one and the three-phase load on the transformer is very well balanced i.e. results in very low negative sequence current.

Figure 2:
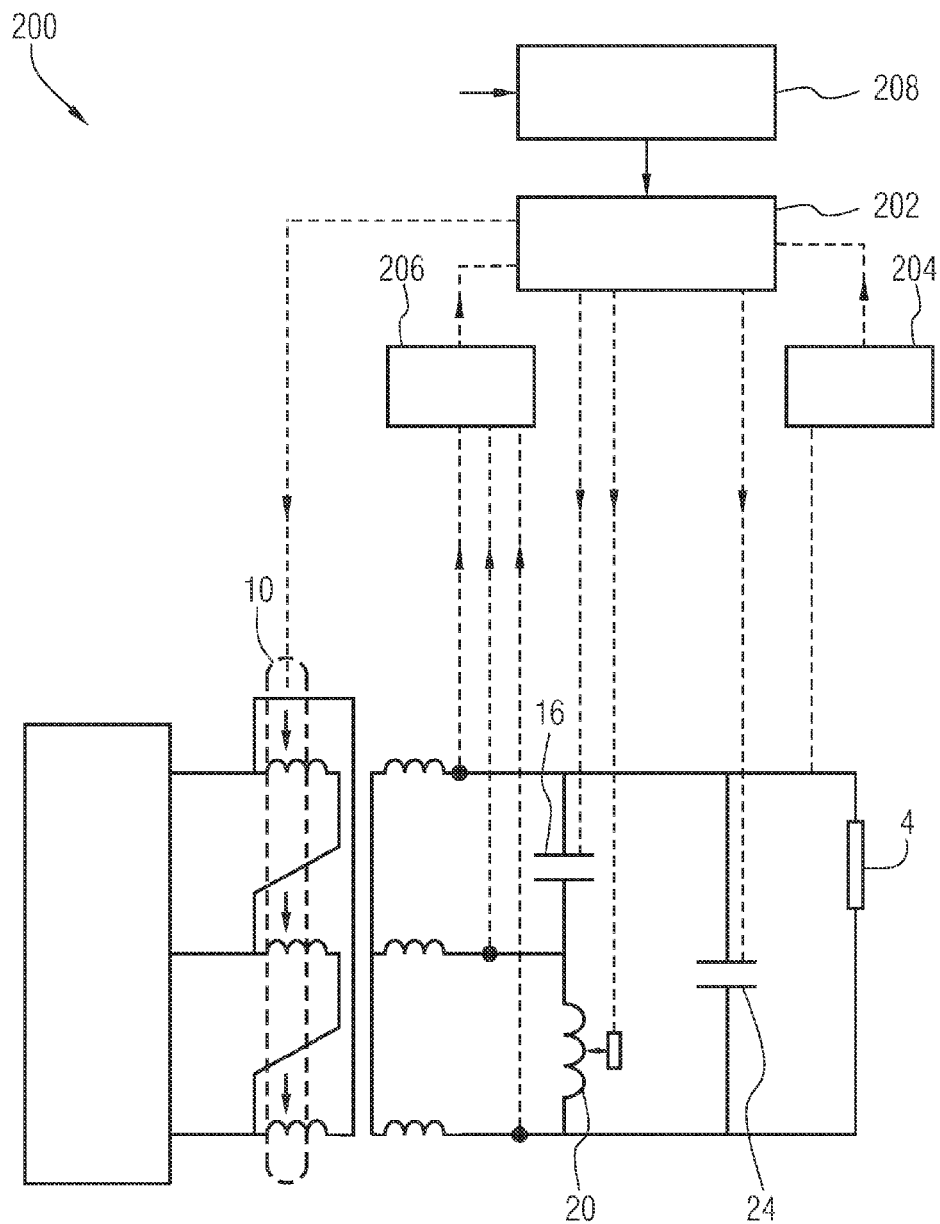
FIG. 2 illustrates the power supply arrangement with a controlling unit according to an embodiment.

FIG. 2 illustrates the power supply arrangement 200 with a control unit 202 according to an embodiment. The power supply arrangement is shown comprising a control unit 202 adapted to automatically control said first tap changer 10, first capacitor means 16, second capacitor means 24 and inductor means 20. Here the control unit 202 is the Programmable Logic Controller (PLC) controlled from on-site or a remoter location which performs the automatic control. The power supply arrangement further comprises at least one first measuring unit 204 to measure the single phase load parameters and at least one second measuring unit 206 to measure the three phase load parameters. The load parameters measured could be cable power factor, voltage, current etc. The power supply arrangement could further be controlled from a remote location by using a remote control panel 208.

Figure 3:
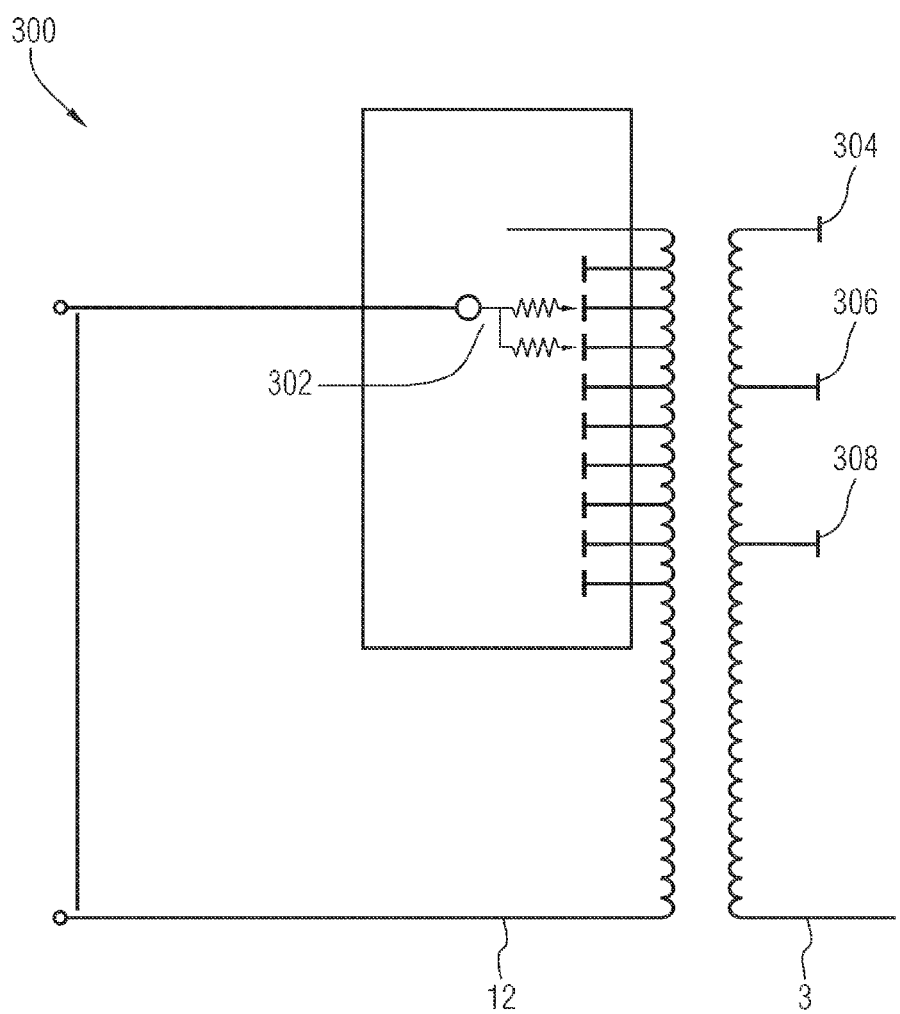
FIG. 3 shows the transformer with an on-load tap changer installed on High voltage (HV) side and Off-load taps on Low Voltage (LV) side according to an embodiment.

FIG. 3 shows a transformer arrangement 300 with an on-load tap changer 302 installed on HV side 12 and plurality of off-load taps on LV side 3 according to an embodiment. On-load tap-changer and off-load taps allow changing the voltage and power for direct electrical heating (DEH) while the transformer and the whole DEH system remains energized. The transformer shown here comprises an on-load tap changer 302 with nine voltage levels or positions. The figure also shows two fixed tap positions provided at 77% and 60% of normal voltage, apart from the normal fixed tap position at 100% of normal voltage at the low voltage side. The normal fixed tap position 304 is shown at 100% of normal voltage along with a first fixed tap position 306 at 77% of normal voltage and a second fixed tap position 308 at 60% of the normal voltage. Accordingly, this arrangement allows 3*9=27 different voltage positions or levels in full required power range. For transformers of higher size, an on-load tap changer with more positions can be selected, e.g. up to 36 on-load taps, to switch without interrupting the load. Similarly we can change the number of fixed position taps.

Figure 4:
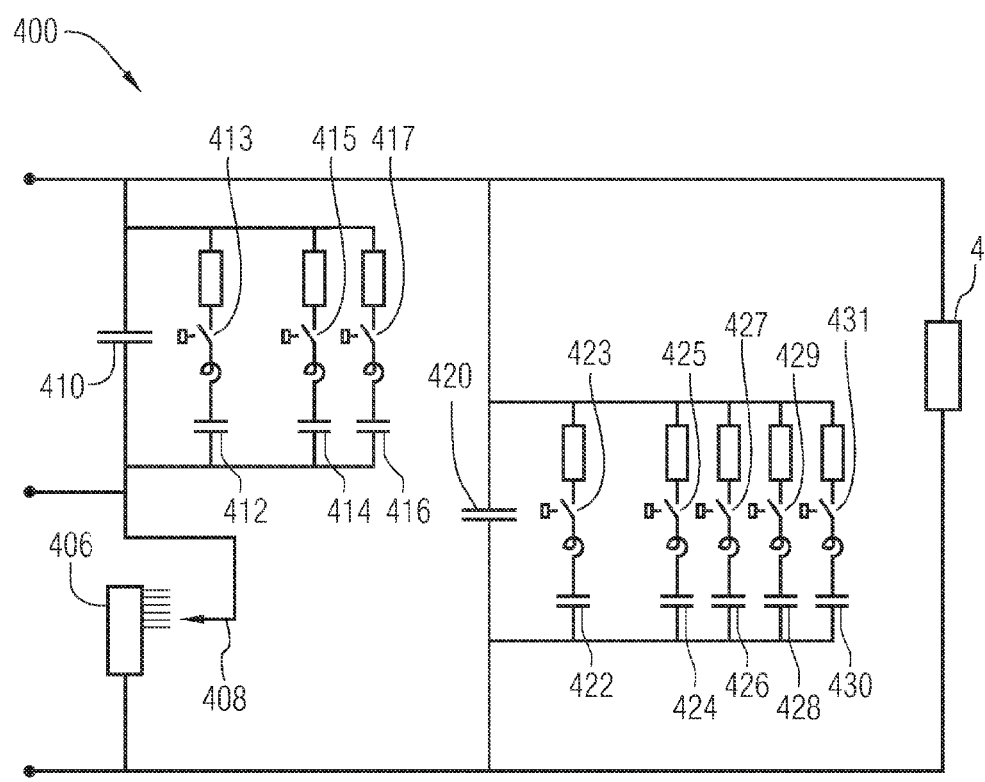
FIG. 4 shows the structure of load balancing system according to an embodiment.

FIG. 4 shows a circuit arrangement 400 of load balancing system according to an embodiment. As illustrated the capacitive values of the first capacitor means 410 and the second capacitor means 420 are controlled by switching additional smaller capacitor units. Additional capacitors are switched to the circuit using vacuum contactors. The first additional capacitors 412, 414, 416 are switched to the circuit as per the requirement along side the first capacitor means 410 using respective vacuum contactors 413, 415, 417. The same is true with the second capacitor means 420. The second additional capacitors 422, 424, 426, 428, 430 are switched to the circuit as per the requirement along side the second capacitor means 420 using respective vacuum contactors 423, 425, 427, 429, 431. As illustrated, the inductance of the inductor means 406 is controlled by changing taps using on-load tap changer 408. The transformer, the first capacitor means, the second capacitor means, the inductor means, the first additional capacitor, the second additional capacitor and the vacuum contactor are dry-type. Using said components lowers potential risks with regards to fire thereby enabling more safety.

Summarizing, the various embodiments relate to a power supply arrangement for supplying electrical power to the pipeline. The power supply arrangement 100 for direct electrical heating of a pipeline system comprises basically of a three phase transformer 2, a symmetrization unit 14 and a compensation unit 22. The three phase transformer 2 is adapted to support a single phase load 4 connected between a first phase 6 and a second phase 8 of the transformer 2. The transformer 2 comprises at least one first tap changer 10 at a high voltage side 12 of the transformer 2. The symmetrization unit 14 comprising a first capacitor means 16 connected between the first phase 6 and a third phase 18 of the transformer and an inductor means 20 connected between the second phase 8 and the third phase 18 of said transformer 2. The compensation unit 22 comprising a second capacitor means 24 connected between the first phase 6 and the second phase 8 of the transformer 2. The first tap changer 10, the first capacitor means 16, the second capacitor means 24 and the inductor means 20 are adapted to be varied on-load.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined.

What is claimed is:

1. A power supply arrangement for direct electrical heating of as pipeline system comprising:
    a three phase transformer adapted to support a single phase load connected between a first phase and a second phase of the transformer, said transformer comprising at least one first tap changer at a high voltage side of the transformer;
    a symmetrization unit comprising both (a) a first capacitor means and (b) at least one first additional capacitor in parallel with the first capacitor means connected between the first phase and a third phase of the transformer and an inductor means connected between the second phase and the third phase of said transformer; and
    a compensation unit comprising both (a) a second capacitor means and (b) at least one second additional capacitor in parallel with the second capacitor means connected between the first phase and the second phase of the transformer, and
    a control unit adapted to automatically control voltage levels of said first tap changer, capacitance of said first capacitor means and said second capacitor means and inductance of said inductor means,
    wherein automatically controlling the capacitance of said first capacitor means comprises switching the at least one first additional capacitors using at least one corresponding first vacuum contactor, and automatically controlling the capacitance of said second capacitor second comprises switching the at least one second additional capacitors using at least one corresponding second vacuum contactor.

2. The power supply arrangement according to claim 1, wherein the three phase transformer further comprises at least one second tap changer.

3. The power supply arrangement according to claim 1, wherein the inductance of the inductor means is adapted to be changed on-load using a third tap changer.

4. The power supply arrangement according to claim 1, wherein at least one of the transformer, the first capacitor means, the second capacitor means, the inductor means, the first additional capacitor, the second additional capacitor, and the vacuum contactor are dry-type.

5. The power supply arrangement according to claim 1, further comprising at least one first measuring unit to measure the single phase load parameters and at least one second measuring unit to measure the three phase load parameters.

6. The power supply arrangement according to claim 5, wherein the load parameters measured are selected from: a cable power factor, voltage, current.

7. A pipeline system comprising a power supply arrangement with,
    a three phase transformer adapted to support a single phase load connected between a first phase and a second phase of the three phase transformer,
    a first tap changer connected to a high voltage side of the three phase transformer,
    a symmetrization unit comprising a first capacitor means connected between the first phase and a third phase of the transformer and an inductor means connected between the second phase and the third phase of said three phase transformer,
    a compensation unit comprising a second capacitor means connected between the first phase and the second phase of the three phase transformer,
    a first measurement unit connected between the first capacitor means and the three phase transformer and configured to measure at least one three phase load parameter selected from the group consisting of a cable power factor, a voltage, and a current,
    a second measurement unit connected between the second capacitor means and the single phase load and configured to measure at least one single phase load parameter selected from the group consisting of a cable power factor, a voltage, and a current, and
    a control unit adapted to receive the measured at least one three phase load parameter and the measured at least one single phase load parameter, and based on the received load parameters, automatically control said first tap changer, first capacitor means, second capacitor means and inductor means.

8. The pipeline system according to claim 7, wherein the control unit is the Programmable Logic Controller controlled from on-site or a remoter location which performs the automatic control.

9. The pipeline system according to claim 7, wherein the load parameters measured are selected from: a cable power factor, voltage, current.

10. The pipeline system according to claim 7, further comprising a remote control panel for controlling the power supply arrangement.

11. The pipeline system according to claim 7, wherein the transformer comprises a plurality of tap positions on the high voltage side and a plurality of tap positions on the low voltage side.

12. The pipeline system according to claim 7, wherein at least one of the first and second capacitor means comprise a capacitor wherein capacitive values of further capacitors are controlled by switching additional smaller capacitor units.

13. The pipeline system according to claim 12, wherein the additional capacitors are switched using vacuum contactors.

14. The pipeline system according to claim 7, wherein the inductance of the inductor means is controlled by changing taps using an on-load tap changer.

15. The pipeline system according to claim 7, wherein the transformer, the first capacitor means, the second capacitor means, the inductor means, the first additional capacitor, the second additional capacitor and the vacuum contactor are dry-type.

\* \* \* \* \*